J. H. WARBURTON.
VERMIN EXTERMINATOR FOR HOGS.
APPLICATION FILED APR. 24, 1915.
1,179,246.
Patented Apr. 11, 1916.
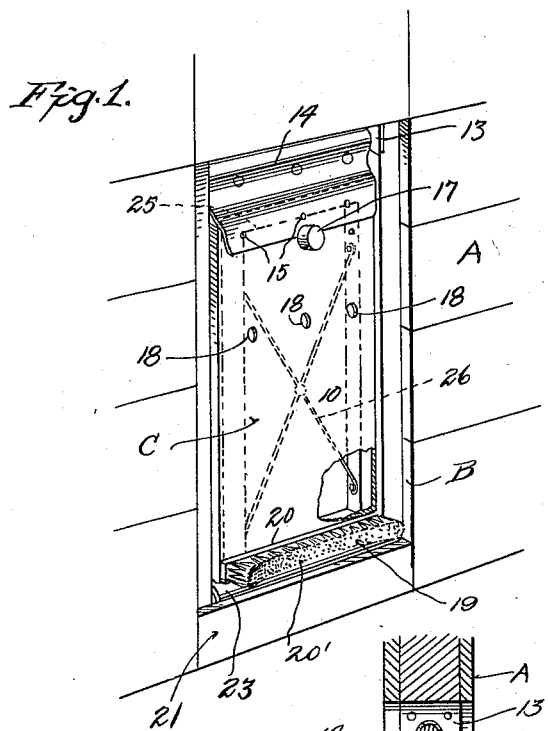
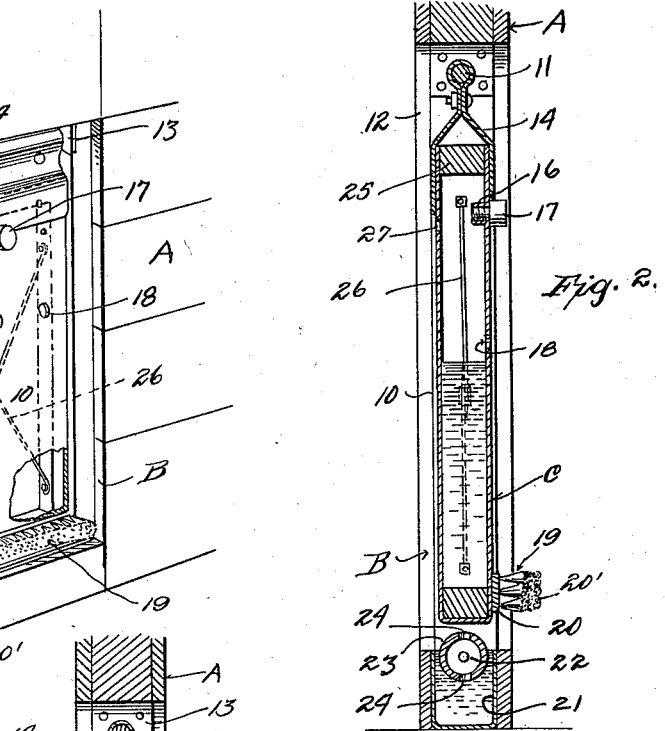
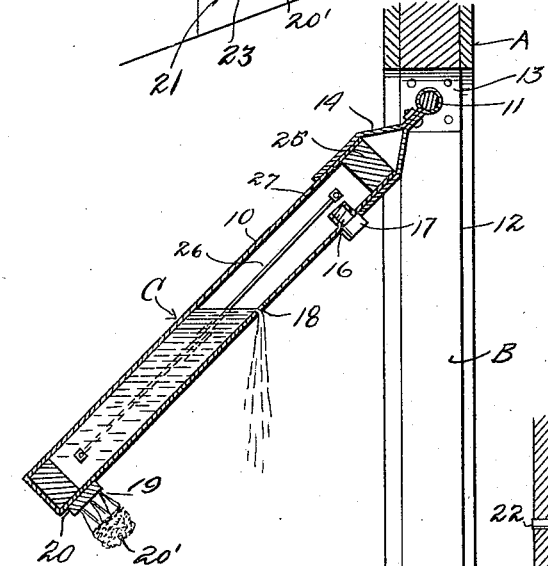
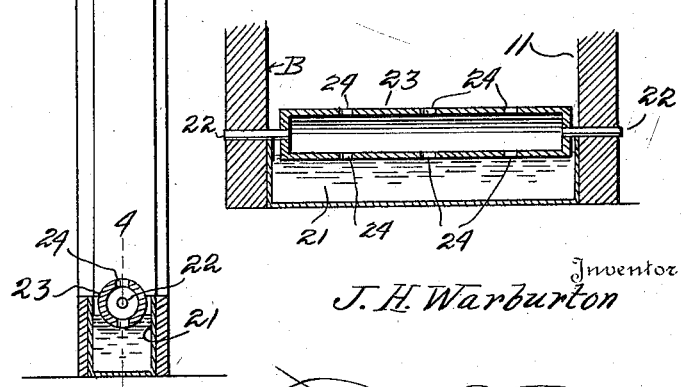
Inventor
J. H. Warburton

UNITED STATES PATENT OFFICE.

JAMES H. WARBURTON, OF GERMANIA, IOWA.

VERMIN-EXTERMINATOR FOR HOGS.

1,179,246.   Specification of Letters Patent.   Patented Apr. 11, 1916.

Application filed April 24, 1915. Serial No. 23,696.

*To all whom it may concern:*

Be it known that I, JAMES H. WARBURTON, a citizen of the United States, residing at Germania, in the county of Kossuth, State of Iowa, have invented certain new and useful Improvements in Vermin-Exterminators for Hogs; and I do hereby declare the following to be a full, clear, and exact description of the invention, such as will enable others skilled in the art to which it appertains to make and use the same.

This invention relates to vermin exterminators for hogs and more particularly to an apparatus adapted for location within the door opening of a house whereby suitable insecticides may be applied to the back and underside of an animal while passing through said opening.

An object of the invention resides in the provision of an apparatus of the above character embodying an insecticide reservoir in the form of a door which normally closes the entrance to the house and protects the interior thereof from the weather, said reservoir being mounted to swing within the door opening, and being automatically operable to apply the insecticide during passage of an animal in one direction through the latter.

A further object of the invention is to provide a vermin exterminator embodying novel means for evenly distributing the insecticide during its application to the animal.

With the above and other objects of similar nature in view, the invention consists in the construction, combination and arrangement of parts, set forth in and falling within the scope of the appended claims.

In the drawing: Figure 1 is a perspective view of the apparatus arranged in position for use. Fig. 2 is a vertical sectional view therethrough. Fig. 3 is a view similar to Fig. 2 with the parts in position to apply the insecticide, and Fig. 4 is a transverse sectional view taken on the line 4—4 of Fig. 3.

Referring now more particularly to the drawing, A designates the front wall of a house provided with a door opening B, the invention being arranged within said opening and indicated generally at C.

In detail the invention includes a tank or reservoir 10 for the insecticide which is mounted to swing within the door opening B either inwardly or outwardly thereof. This reservoir is of a size and shape to approximately fit the door opening and is normally disposed in position to close the latter whereby to protect the interior of the house against exposure to the weather. Supporting the reservoir 10 within the opening B is a transverse rod 11 which passes through the side members 12 of the door frame and is suitably secured in place as indicated at 13. At the upper end of the reservoir is an elongated strap hinge 14, the free ends of which engage upon opposite sides of the reservoir and are secured by rivets 15, the rod 11 passing loosely through this hinge whereby the reservoir may swing freely therefrom. Formed centrally of the reservoir adjacent its upper end is a filling opening 16 through which the insecticide is readily admitted, a screw plug 17 being employed to normally close the same. Below the filling opening, outlet ports 18 are provided that are designed to permit egress of the insecticide as will subsequently be explained. At the lower or free end of the reservoir on the side with the filling and outlet openings, is a brush 19 suitably secured as at 20 and extending throughout the width of the reservoir, the face of the brush being concaved as at 20 to conform substantially to the back of an animal. By this construction it is evident that an animal in entering the house through the doorway B will cause the reservoir to swing inwardly on its hinge and thus permit the insecticide to flow out of the ports 18 and onto the back, the brush 19 engaging the back and evenly distributing the liquid over the surface thereof.

For applying insecticide to the under side of the animal, there is provided at the bottom of the door opening between the frame members 12, a trough 21, and journaled upon shafts 22 supported from said members, is a hollow roller 23 having in its periphery openings 24. The roller projects above the upper edge of the trough and engages the under side of the animal as it passes through the door, insecticide being held in the trough to be gathered therefrom by the roller and evenly applied to the surface of the body as is readily apparent.

Arranged within and bracing the reservoir 10 is a rectangular frame 25 of wood or other suitable material and connecting the side members of the frame are crossed diagonal rods 26, distortion of the reservoir being in this manner prevented should an animal attempt to wedge his body between it and the door frame. There is also provided in a wall of the reservoir, vent openings 27 through which air is permitted to enter and thereby assist the discharge of insecticide through the outlet 18.

What is claimed is:—

1. An apparatus of the class described, comprising the combination with a door frame, of an insecticide reservoir supported for swinging movement within the frame and having outlet ports therein, said reservoir being operable by passage of an animal through the doorway to automatically discharge the insecticide through said ports, and means arranged at the free end of the reservoir for evenly distributing the insecticide upon said animal.

2. In an apparatus of the class described, the combination with a door frame of a door supported to swing within said frame and normally closing same, said door comprising a hollow insecticide reservoir having outlet ports therein, and being operable by passage of an animal through the doorway to discharge the insecticide through said ports, and means at the free end of the door for evenly distributing the insecticide upon said animal.

3. An apparatus of the class described, comprising the combination with a door frame, of an insecticide reservoir supported to swing within the frame and having outlet ports therein, a brush arranged at the free end of the reservoir, a trough disposed transversely of the lower end of the frame for receiving an insecticide, and a roller mounted within the trough and projecting thereabove, said roller and reservoir being operable simultaneously by passage of an animal through the doorway to apply and evenly distribute the insecticide upon the back and underside of the animal.

In testimony whereof, I affix my signature, in the presence of two witnesses.

JAMES H. WARBURTON.

Witnesses:
G. S. DALTON,
L. A. LLOYD.